(12) United States Patent
Noda

(10) Patent No.: US 7,292,395 B2
(45) Date of Patent: Nov. 6, 2007

(54) DUAL-FOCUS SWITCHABLE LENS

(75) Inventor: Takayuki Noda, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/527,600

(22) Filed: Sep. 27, 2006

(65) Prior Publication Data

US 2007/0070523 A1    Mar. 29, 2007

(30) Foreign Application Priority Data

Sep. 28, 2005    (JP) .......................... P2005-282790

(51) Int. Cl.
    *G02B 15/14* (2006.01)
(52) U.S. Cl. ..................................... 359/689
(58) Field of Classification Search ............... 359/683, 359/689
    See application file for complete search history.

(56) References Cited

U.S. PATENT DOCUMENTS

| | | | |
|---|---|---|---|
| 4,779,969 A | 10/1988 | Sato et al. | |
| 6,839,184 B1 | 1/2005 | Shan | |
| 7,006,300 B2 * | 2/2006 | Shinohara | .................. 359/689 |
| 2005/0046960 A1 | 3/2005 | Saori | |
| 2005/0057817 A1 | 3/2005 | Ori | |
| 2006/0082900 A1 * | 4/2006 | Sugiyama et al. | .......... 359/689 |
| 2006/0262423 A1 * | 11/2006 | Kiyotoshi | ................... 359/689 |
| 2007/0053072 A1 * | 3/2007 | Nanba | ........................ 359/689 |

FOREIGN PATENT DOCUMENTS

| | | |
|---|---|---|
| JP | 10-206732 A | 8/1998 |
| JP | 2004-93647 A | 3/2004 |
| JP | 2004-252294 A | 9/2004 |
| JP | 2005-84647 A | 3/2005 |
| WO | WO-99/35517 A2 | 7/1999 |

\* cited by examiner

*Primary Examiner*—Scott J. Sugarman
(74) *Attorney, Agent, or Firm*—Birch, Stewart, Kolasch & Birch, LLP (57) ABSTRACT

A dual-focus switchable lens is provided and includes: in order from the object side, a first lens group having a negative refractive power, a second lens group having a positive refractive power and a third lens group having a positive refractive power. The first lens group includes a lens having a negative refractive power and a lens having a positive refractive power in order from the object side, at least one of the lenses being an aspherical lens. The second lens group includes a cemented lens and a single lens having an aspherical surface and having a negative refractive power in order from the object side. The third lens group is a positive lens. Two focal points of the dual-focus switchable lens is switched by moving the second lens group while maintaining the first and third lens groups substantially stationary, and the dual-focus switchable lens satisfies specific conditional expressions.

7 Claims, 7 Drawing Sheets

DUAL-FOCUS SWITCHABLE LENS

BACKGROUND OF THE INVENTION

1. Field of the Invention

The present invention relates to a dual-focus switchable lens in a three-group structure, and more particularly to a dual-focus switchable lens, to be mounted on a mobile phone or the like, suited as a quite small-sized imaging lens having a wide angle-of-view and a magnification ratio between wide-angle and telephoto positions of 1.9 or greater.

2. Description of Background Art

Recently, a variety of small-sized lenses have been developed to be mounted on small-sized digital cameras, etc.

Above all, those described in JP-A-2004-93647 and JP-A-2005-84647 are known as imaging lenses, favorable in optical performance, each having a zoom function and a simple structure with three groups and six lenses.

Meanwhile, there is recently an increasing demand for an imaging lens to be mounted on a personal digital assistant, such as a cellular phone.

In the imaging lens for mounting on such a personal digital assistant, performance improvement in image quality, distortion, etc. is desired equally in degree to those mounted on the usual camera, such as the digital camera described in JP-A-2004-93647 and JP-A-2005-84647. Due to the requirement of size and thickness reductions for the personal digital assistant, there is a further increasing requirement for size-reducing the imaging lens to be mounted thereon. Meanwhile, there is a trend to provide a variable-magnification function for such an imaging lens to be mounted on a personal digital assistant.

However, where providing a variable-magnification function through utilization of optical zooming, two lens groups minimally must be moved for focal adjustment over the entire zoom range, thus complicating the structure and inevitably increasing the lens overall length.

Meanwhile, the three-grouped zoom lens, say described in JP-A-2004-93647 and JP-A-2005-84647, is structured compact. However, those are structured such that, by moving both the first and second lens groups during zooming, the imaging plane is suppressed from moving due to magnification change simultaneously with changing the magnification. For this reason, during zooming, the first lens group the closest in position to the object is moved back and forth. For the personal digital assistant including a cellular phone, it is not desirable to move the front, or first, lens group back and forth in respect of compactness, etc. Besides, there is a fear that dust, etc. possibly intrude in the lens system, which is a problem desirably to be avoided.

SUMMARY OF THE INVENTION

An object of an illustrative, non-limiting embodiment of the invention is to provide a dual-focus switchable lens, which is to maintain a first lens group stationary during changing the magnification and is excellent in compactness, thus suitably correcting for aberrations.

According to one aspect of the invention, there is provided a dual-focus switchable lens including: in order from an object side of the dual-focus switchable lens, a first lens group having a negative refractive power, the first lens group including a first lens having a negative refractive power and a second lens having a positive refractive power in order from the object side, at least one of the first and second lenses being an aspherical lens;

a second lens group having a positive refractive power, the second lens group including a cemented lens and a single lens having an aspherical surface and having a negative refractive power in order from the object side;

a third lens group having a positive refractive power, the third lens group including a positive lens, wherein two focal points of the dual-focus switchable lens is switched by moving the second lens group while maintaining the first and third lens groups substantially stationary, and the dual-focus switchable lens satisfies conditional expressions (1) to (6):

$$22<(W_w+W_t)/2<34 \quad (1)$$

$$2<|f_5|/f_w \quad (2)$$

$$4.5<T_L/Y_{IM}<6.5 \quad (3)$$

$$1.75 \leq f_t/f_w \leq 3.0 \quad (4)$$

$$2.3 \leq FNO_w \leq 3.5 \quad (5)$$

$$16.0 \leq \nu_1-\nu_2 \quad (6)$$

wherein $W_w$ represents a half angle-of-view in a wide-angle position of the dual-focus switchable lens;

$W_t$ represents a half angle-of-view in a telephoto position of the dual-focus switchable lens;

$f_w$ represents a focal length of the dual-focus switchable lens in the wide-angle position;

$f_t$ represents a focal length of the dual-focus switchable lens in the telephoto position $f_5$ represents a focal length of the single lens in the second lens group;

$T_L$ represents a maximum length of the dual-focus switchable lens (i.e., a longer one of total lengths in the wide-angle position and in the telephoto position);

$Y_{IM}$ represents an image height $FNO_w$ represents F number in the wide-angle position;

$\nu_1$ represents Abbe number of the first lens; and $\nu_2$ represents Abbe number of the second lens.

Preferably, conditional expression (7), given below, is satisfied:

$$0.65<(f_{1G}+f_{2G}+d_w)/Y_{IM}<1.3 \quad (7)$$

wherein $f_{1G}$ represents a focal length of the first lens group;

$f_{2G}$ represents a focal length of the second lens group;

$d_w$ represents a spacing between the first and the second lens groups in the wide-angle position.

Preferably, conditional expression (8), given below, is satisfied:

$$1.1<f_{2G}/f_w<1.8 \quad (8).$$

Preferably, the single lens in the second lens group is provided as a meniscus lens of a synthetic resin having aspherical surfaces at both surfaces whose convex surface is directed toward the object side.

Preferably, a diaphragm is arranged in the second lens group in a position closest to the object.

Preferably, an image-side edge of an image-side lens (a lens closer to an image) constituting the cemented lens in the second lens group and an object-side edge of the single lens in the second lens group are both made as flat surfaces, and the two flat surfaces (i.e., the image-side edge of the image-side lens of the cemented lens and the object-side edge of the single lens) are adjacent to each other (that is, the edges are in a common straight line) or sandwiches a plane parallel plate having surfaces parallel with the flat surfaces.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, magnification change can be done by a positional shift between two focal points. When shifting (switching) between the two focal points, the second lens group is moved while the first and third lens groups are rendered substantially stationary. Due to this, magnification-change operation can be done by moving only the second lens group, thus securing compactness and simplicity for a personal digital assistant, particularly a cellular phone. Besides, dusts, etc. are prevented from intruding into the lens system during movement of the extreme front lens group.

Meanwhile, by providing a suitable number of lenses constituting each of three lens groups, arranging a aspherical surface in a proper position and further satisfying predetermined, six conditional expressions, the lens system is secured with compactness and correctable for aberrations favorably.

Incidentally, there is known a dual-focus switchable lens, say, in the description of JP-A-2004-252294. This lens is structured quite simple with three groups, three lenses. With such a dual-focus switchable lens, there is a difficulty, in nature, in providing a magnification ratio at 1.9 or greater and greatly improving the optical performance. Furthermore, it is insufficient in obtaining a resolution and chromatic aberration compatible with the current imager having 1-mega pixels or greater, and hence different in basic technical idea from the dual-focus switchable lens according to the invention.

While referring to the drawings, explanation will be made on a dual-focus switchable lens according to exemplary embodiments of the present invention. Incidentally, the embodiment will be explained by using, representatively, the arrangement of an embodiment 1.

Figure 1:
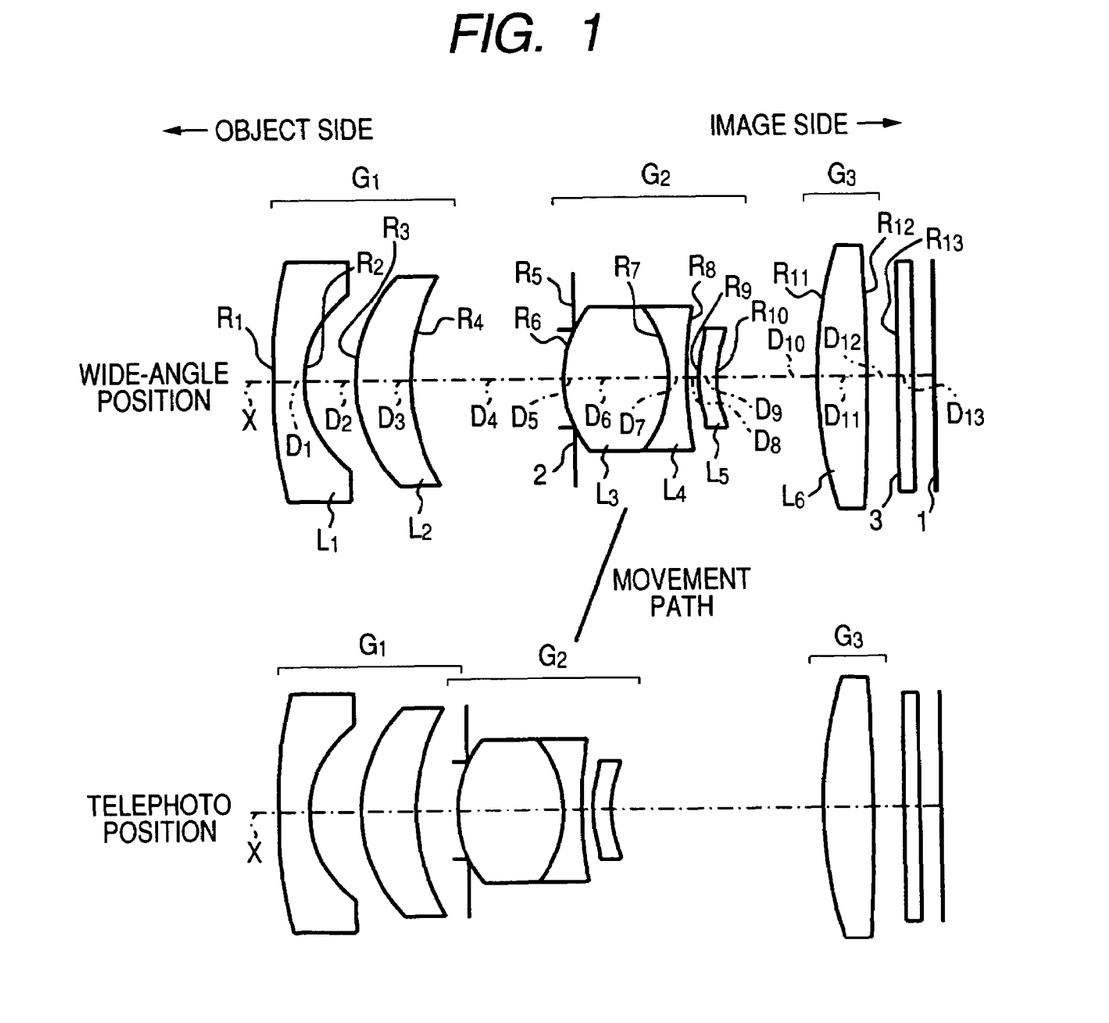
FIG. 1 is a schematic view showing a basic arrangement of a dual-focus switchable lens according to an exemplary embodiment 1 of the present invention.

FIG. 1 shows a lens arrangement of a dual-focus switchable lens according to the embodiment, in a wide-angle (WIDE) and telephoto (TELE) position.

The three-group dual-focus lens, in this embodiment, includes a first lens group $G_1$ having a negative refractive power, a second lens group $G_2$ having a positive refractive power and a third lens group $G_3$ having a positive refractive power, in the order of from an object side, as shown in FIG. 1. By moving the second lens group $G_2$ along an optical axis X at between two focal points, the system overall is changed in focal length f, to be switched to the wide-angle position (lower magnification side) or the telephoto position (higher magnification side), thus efficiently converging a luminous flux onto a focal plane 1.

Figure 2:
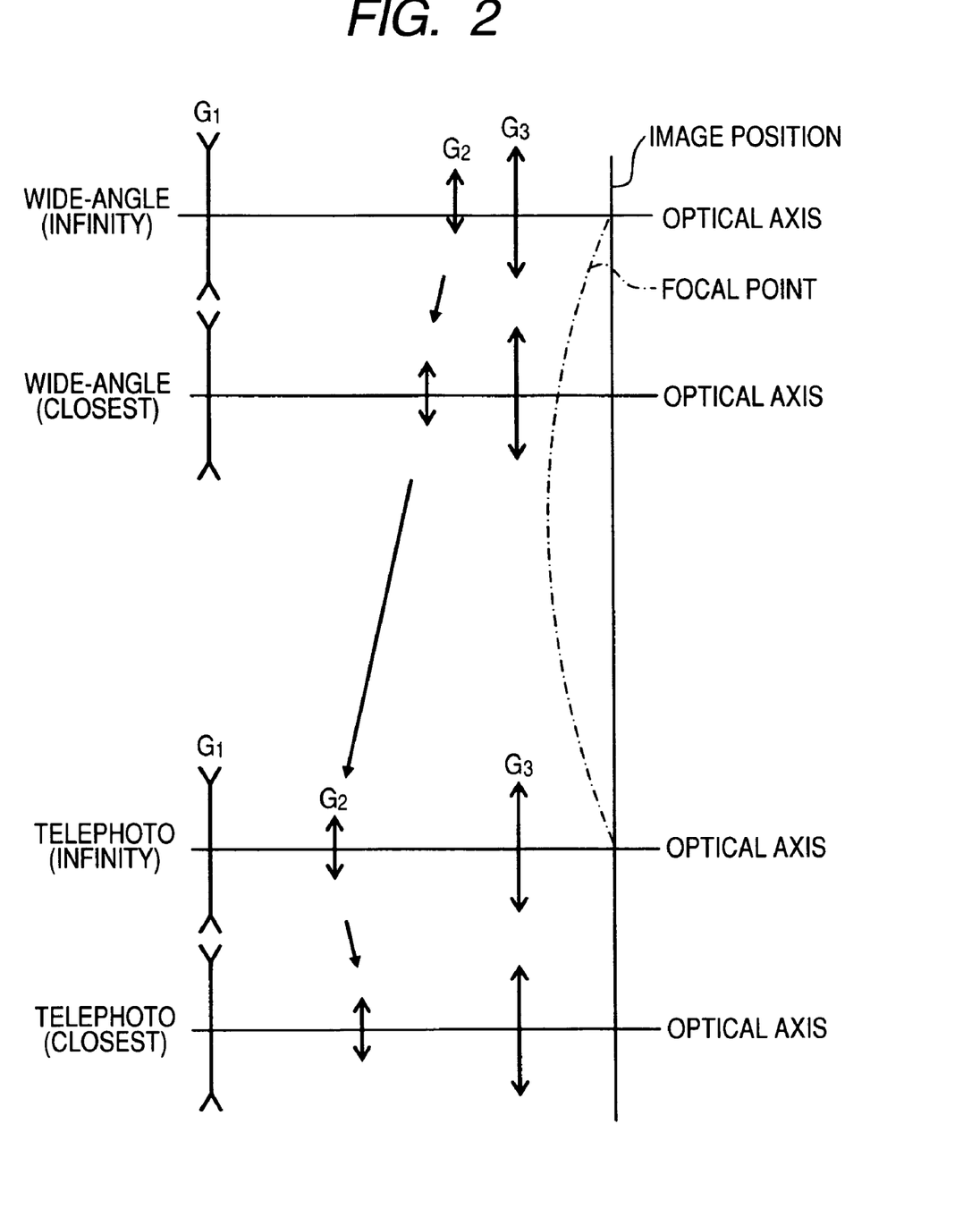
FIG. 2 is a diagram showing a focal-point change upon movement of a second lens group from the wide-angle position to the telephoto position as well as lens arrangements of infinity and closest in wide-angle and telephoto positions, in a dual-focus switchable lens according to an exemplary embodiment of the present embodiment.

Namely, during switching from the wide-angle (lower magnification) end to the telephoto (higher magnification) end, the first and second lens group $G_1$, $G_2$ are moved closer to each other while the second and third lens group $G_2$, $G_3$ are moved away from each other. During the switching, the first and third lens groups $G_1$, $G_3$ are both maintained stationary. As shown in FIG. 2, when the second lens group $G_2$ is moved toward the object side in a direction of from the wide-angle end to the telephoto end, the focal point once shifts toward the object side but turns back, at the intermediate of the wide-angle and telephoto positions, into the former position. In conclusion, arrangement is made to make the focal point coincident on the optical axis X in between the wide-angle and telephoto positions. By providing an image-taking plane in such a position, incorrect focusing can be avoided in each of the wide-angle and telephoto positions.

In this manner, in the dual-focus switchable lens in this embodiment, magnification is to be changed by switching the two focal points. The magnification is changed by moving only the second lens group $G_2$. Because the first lens group $G_1$ positioned extreme front is free from moving back and forth during the operation of magnification change, compactness and simplicity are to be secured for a personal digital assistant, particularly a mobile phone. Furthermore, dust, etc. can be avoided from intruding in the lens system.

Meanwhile, in the dual-focus-selective variable magnification system, because of no need to consider the performance in an intermediate range, it is easy to improve the performance in the wide-angle and telephoto positions. Meanwhile, by rendering the first lens group $G_1$ stationary, the lens system overall is not changed in length, thus enabling to reduce the lens outer diameter over the entire length.

In a variable-magnification system having lenses less in the number using an aspherical surface, where intended to constitute a lens reduced in peripheral-ray eclipse and improved in resolution to a possible extent, aperture inevitably increases at the front, first lens group $G_1$, thus making it difficult to reduce the lens outer diameter. However, in case the first lens group $G_1$ is provided as a stationary group as in this embodiment, there is eliminated the need to consider the aperture change due to movement of the lens group. In addition, because of no need to provide a lens drive mechanism on the lens frame, aperture can be taken greater in the ratio to lens outer diameter. This can form, with a smaller diameter, a lens that is reduced in peripheral-ray eclipse and made favorable in resolution.

Furthermore, the first lens group $G_1$ is arranged with a negative first lens $L_1$ and a positive second lens $L_2$, in the order of from the object side. Desirably, the arrangement is with a first lens $L_1$ made by a negative meniscus lens having a concave surface directed toward the object side and a second lens $L_2$ made by a positive meniscus lens having a convex surface directed toward the object side, in the order of from the object side.

Meanwhile, the second lens group $G_2$ is arranged with a third lens $L_3$ forming a cemented lens, a fourth lens $L_4$ and a fifth lens $L_5$ as a positive or negative single lens having an aspherical surface, in the order of from the object side. Desirably, the arrangement is with a diaphragm 2, a cemented lens that joins together a third lens $L_3$ made as a convex-at-both-sides lens and a fourth lens $L_4$ made as a concave-at-both-sides having a surface greater in radius-of-curvature directed toward the object side, and a fifth lens $L_5$ made as a positive or negative meniscus lens having, at both sides, aspherical surfaces having a concave surface directed toward the object side. Incidentally, the fifth lens $L_5$ is desirably formed of synthetic resin.

Furthermore, a diffractive optical element (DOE) can be additionally provided on the surface of the fifth lens $L_5$.

Meanwhile, the diaphragm 2 is arranged on the second lens group $G_2$ in a position closest to the second lens group $G_2$, and to be moved in unison with the lenses of the second lens group $G_2$ during changing the magnification.

The third lens group $G_3$ is structured by the positive sixth lens $L_6$. Desirably, it is structured by the sixth lens $L_6$ formed by a convex-at-both-sides lens having an intense curvature toward the object side or a positive meniscus lens having a convex surface directed toward the object side.

Between the sixth lens L6 and the focal plane (CCD imaging surface) 1, there is arranged a filter 3 including a low-pass filter and an infrared filter.

Meanwhile, an image-side edge of the fourth lens $L_4$, closer to the image, constituting the cemented lens in the second lens group $G_2$ and an object-side edge of the single, fifth lens $L_5$ in the second lens group $G_2$ are both made as flat surfaces. By employing either one arrangement, i.e. those are adjacent to each other or the two flat surfaces sandwich a plane parallel plate having surfaces parallel with those surfaces, labor and time can be relieved and assembling accuracy be improved upon aligning the optical axis of between the lenses constituting the second lens groups $G_2$ (eccentric axial adjustment).

Note that, in the description, the expression of convex or concave (positive or negative) of a lens or lens surface signifies a shape thereof at or around the axis. For a naspherical surface particularly, it does not mean a shape of the entire surface.

Furthermore, the dual-focus switchable lens in this embodiment satisfies the following conditional expressions (1) to (8).

$$22 < (W_w + W_t)/2 < 34 \quad (1)$$

$$2 < |f_5|/f_w \quad (2)$$

$$4.5 < T_L/Y_{IM} < 6.5 \quad (3)$$

$$1.75 \leq f_t/f_w \leq 3.0 \quad (4)$$

$$2.3 \leq FNO_w \leq 3.5 \quad (5)$$

$$16.0 \leq \nu_1 - \nu_2 \quad (6)$$

$$0.65 < (f_{1G} + f_{2G} + d_w)/Y_{IM} < 1.3 \quad (7)$$

$$1.1 < f_{2G}/f_w < 1.8 \quad (8)$$

where $W_w$: half angle-of-view in the wide-angle position $W_t$: half angle-of-view in the telephoto position $f_w$: focal length of the overall system, in the wide-angle position $f_t$: focal length of the overall system, in the telephoto position $f_5$: focal length of the fifth lens $L_5$ $T_L$: maximum length of the system overall (longer one of total lengths in the wide-angle position and in the telephoto position)

$Y_{IM}$: image height $FNO_w$: F number in the wide-angle position $f_{1G}$: focal length of the first lens group $G_1$ $f_{2G}$: focal length of the second lens group $G_2$ $d_w$: spacing between the first lens group $G_1$ and the second lens group $G_2$, in the wide-angle position $\nu_1$: Abbe number of the first lens $L_1$ $\nu_2$: Abbe number of the second lens $L_2$ Explanation is now made on the technical significance of the following conditional expressions.

Firstly, conditional expression (1) is to define an arithmetic mean over the half angle-of-view in the wide-angle position and the half angle-of-view in the telephoto position. By setting it in the range of the conditional expression, a sufficient amount of angle-of-view can be secured in each position of magnification change while maintaining the optical performance favorably even when mounted on a mobile phone, a digital camera or the like.

Conditional expression (2) is to define a focal length of the fifth lens $L_5$. By setting a division value of the focal length of the fifth lens $L_5$ by the focal length of the system overall in a range of the conditional expression, it is possible to maintain favorable the variation in chromatic aberration caused due to the change of magnification.

In order to maintain favorable the variation in chromatic aberration caused due to the change of magnification, the lower limit of 5 is preferably provided for conditional expression (2).

Conditional expression (3) is a division of the maximum overall length of the entire system by an image height. By setting it in a range of the conditional expression, the lens system can be achieved in a compact size.

Conditional expression (4) is to define a magnification ratio. By setting it in a range of the conditional expression, a sufficient amount of magnification ratio can be secured while maintaining the optical performance favorably when mounted on a mobile phone, a digital camera or the like.

Conditional expression (5) is to define an F number at the wide-angle position. By setting it in a range of the conditional expression, a sufficient amount of lightness can be secured while maintaining the optical performance favorably when mounted on a mobile phone, a digital camera or the like.

Conditional expression (6) is to define the difference in Abbe number (d-line) of between the first lens $L_1$ and the second lens $L_2$. Where going below the lower limit given by the conditional expression, correction is insufficient for on-axis chromatic aberration, particularly in the telephoto position. The present condition is requisite particularly for those in the invention having a short overall length and a great angle-of-view.

In respect of favorably correcting for on-axis chromatic aberration particularly at the telephoto position, the lower limit of 20.8 is provided for conditional expression (6).

Conditional expression (7) is to define the sum over the focal distance of the first lens group $G_1$, the focal distance of the second lens group $G_2$, and the spacing between the first and second lens groups $G_1$, $G_2$ in the wide angle position. Where going below the lower limit given by the conditional expression, paraxial solution is not to be held at a near distance. Meanwhile, where going above the upper limit given by the conditional expression, there is a difficulty in reducing the overall length.

Conditional expression (8) is to define the focal length of the second lens group $G_2$, i.e. a division of the focal length of the second lens group $G_2$ by the focal length of the system overall in the telephoto position. By setting it in a range of the conditional expression, power arrangement can be maintained proper when changing the magnification. Namely, when going above the upper limit given by the conditional expression, the power is comparatively reduced on the second lens group $G_2$. Despite the optical performance is to be maintained favorable in each of the wide-angle and telephoto positions including during focusing, the amount of movement increases during changing the magnification, thus increasing the overall length of the lens system and hence making it difficult to make a lens system compact. Meanwhile, when going below the lower limit, there is a comparative increase of power on the second lens group $G_2$, thus considerably deteriorating the optical performance in the wide-angle and telephoto positions and further the optical performance during focusing.

Using embodiments 1 to 4, explanation is made further on the dual-focus switchable lens.

Embodiment 1

In Table 1, shown are the values of a radius-of-curvature R (mm) of the lens surface of the dual-focus switchable lens according to embodiment 1, a center thickness of each lens and an air spacing between the lenses (hereinafter, collectively referred to as an on-axis plane-to-plane spacing) D (mm), a refractive index Ne at e-line (546.1 nm) on each lens, and an Abbe number ν at d-line on each lens.

Incidentally, the numerals in the table represents the number of from the object side (true for tables 3, 5 and 7). Meanwhile, in Table 1 are shown the values of focal lengths f in wide-angle and telephoto positions, magnification, F value FNO, half angle-of-views ω in wide-angle position (W) and telephoto position (T), and image height (true for tables 3, 5 and 7).

TABLE 1

| Surface | R | D | Ne(546.1 nm) | ν |
|---|---|---|---|---|
| *1 | −11399.69 | 20.24 | 1.80417 | 40.1 |
| *2 | 85.99 | 33.99 | | |
| 3 | 104.97 | 35.78 | 1.92207 | 19.3 |
| 4 | 146.05 | 110.86(W) | | |
| | | 23.27(T) | | |
| STO 5 | ∞ | −8.10 | | |
| 6 | 78.70 | 70.03 | 1.75455 | 52.5 |
| 7 | −78.70 | 11.74 | 1.80441 | 25.7 |
| 8 | 287.40 | 7.61 | | |

TABLE 1-continued

| Surface | R | D | Ne(546.1 nm) | ν |
|---|---|---|---|---|
| *9 | 72.93 | 12.14 | 1.51035 | 56.1 |
| *10 | 71.99 | 64.47(W) | | |
| | | 152.01(T) | | |
| 11 | 310.31 | 32.38 | 1.84555 | 24.1 |
| 12 | −1556.78 | 20.00 | | |
| 13 | ∞ | 10.12 | 1.51680 | 64.2 |
| 14 | ∞ | 13.95 | | |

*aspherical surface
f: W: 97.38-T: 197.32
Magnification: ×2.03
FNO: 2.8-4.3
Half angle-of-view: W: 37.5° T: 20.5°
Image height: 75.70

Furthermore, in this embodiment, the conditional expressions (1)-(8) are all satisfied wherein the values are shown in Table 9.

In this embodiment, the fifth lens $L_5$ has both surfaces respectively provided with aspherical surfaces whose shapes are expressed by the aspherical surface expression given in the following equation 1. Meanwhile, the first lens $L_1$ has both surfaces respectively provided with aspherical surfaces whose shapes are expressed by the aspherical surface expression given in the following equation 2.

$$Z(r) = \frac{r^2/R}{1+\sqrt{1-K \times r^2/R^2}} + \sum_{i=2}^{5} A_{2i} r^{2i} \quad \text{Equation 1}$$

where

Z(r): length of a vertical d-line drawn from a point, on the aspherical surface distant r ($r^2=x^2+y^2$) from the optical axis, to a tangential plane (plane vertical to the optical axis) as to the apex of the aspherical surface.

R: radius of curvature of the aspherical surface, in a position close to the optical surface.

K: eccentricity $A_{2i}$: aspherical coefficient (i=2-5).

$$Z(r) = \frac{r^2/R}{1+\sqrt{1-K \times r^2/R^2}} + \sum_{i=3}^{20} B_i r^i \quad \text{Equation 2}$$

where

Z(r): length of a vertical d-line drawn from a point, on the aspherical surface distant r ($r^2=x^2+y^2$) from the optical axis, to a tangential plane (plane vertical to the optical axis) as to the apex of the aspherical surface.

R: radius of curvature of the aspherical surface, in a position close to the optical surface.

K: eccentricity $B_i$: aspherical coefficient (i=3-20).

Meanwhile, Table 2 shows the values of constants K, $A_4$, $A_6$, $A_8$ and $A_{10}$ for the aspherical surface shown in the aspherical expression of equation 1, and the values of constants K, $B_3$, $B_4$, $B_5$, $B_6$, $B_7$, $B_8$, $B_9$ and $B_{10}$ for the aspherical surface shown in the aspherical expression of equation 2. Incidentally, the value R as to each of the surfaces 1, 2, 9 and 10 in Table 1 is substituted in R of the aspherical expression.

TABLE 2

| Surface No. | | | | | |
|---|---|---|---|---|---|
| 1 | K | $B_3$ | $B_4$ | $B_5$ | $B_6$ |
|   | 45.26008 | $3.75484 \times 10^{-6}$ | $1.20343 \times 10^{-6}$ | $-2.24293 \times 10^{-8}$ | $-3.63794 \times 10^{-11}$ |
|   |   | $B_7$ | $B_8$ | $B_9$ | $B_{10}$ |
|   |   | $8.36121 \times 10^{-12}$ | $-1.61544 \times 10^{-13}$ | $1.38167 \times 10^{-15}$ | $-4.57422 \times 10^{-18}$ |
| 2 | K | $B_3$ | $B_4$ | $B_5$ | $B_6$ |
|   | -0.19411 | $-7.14084 \times 10^{-6}$ | $2.89317 \times 10^{-6}$ | $-7.72677 \times 10^{-8}$ | $9.54519 \times 10^{-10}$ |
|   |   | $B_7$ | $B_8$ | $B_9$ | $B_{10}$ |
|   |   | $9.51291 \times 10^{-12}$ | $-4.77554 \times 10^{-13}$ | $5.71432 \times 10^{-15}$ | $-2.43865 \times 10^{-17}$ |
| 9 | K | $A_4$ | $A_6$ | $A_8$ | $A_{10}$ |
|   | -11.96262 | $3.13464 \times 10^{-6}$ | $-4.68546 \times 10^{-9}$ | $1.44703 \times 10^{-12}$ | $-2.95463 \times 10^{-16}$ |
| 10 | K | $A_4$ | $A_6$ | $A_8$ | $A_{10}$ |
|   | -3.68709 | $1.90194 \times 10^{-6}$ | $-1.83504 \times 10^{-9}$ | $-4.66091 \times 10^{-13}$ | $4.44571 \times 10^{-16}$ |

Figure 4:
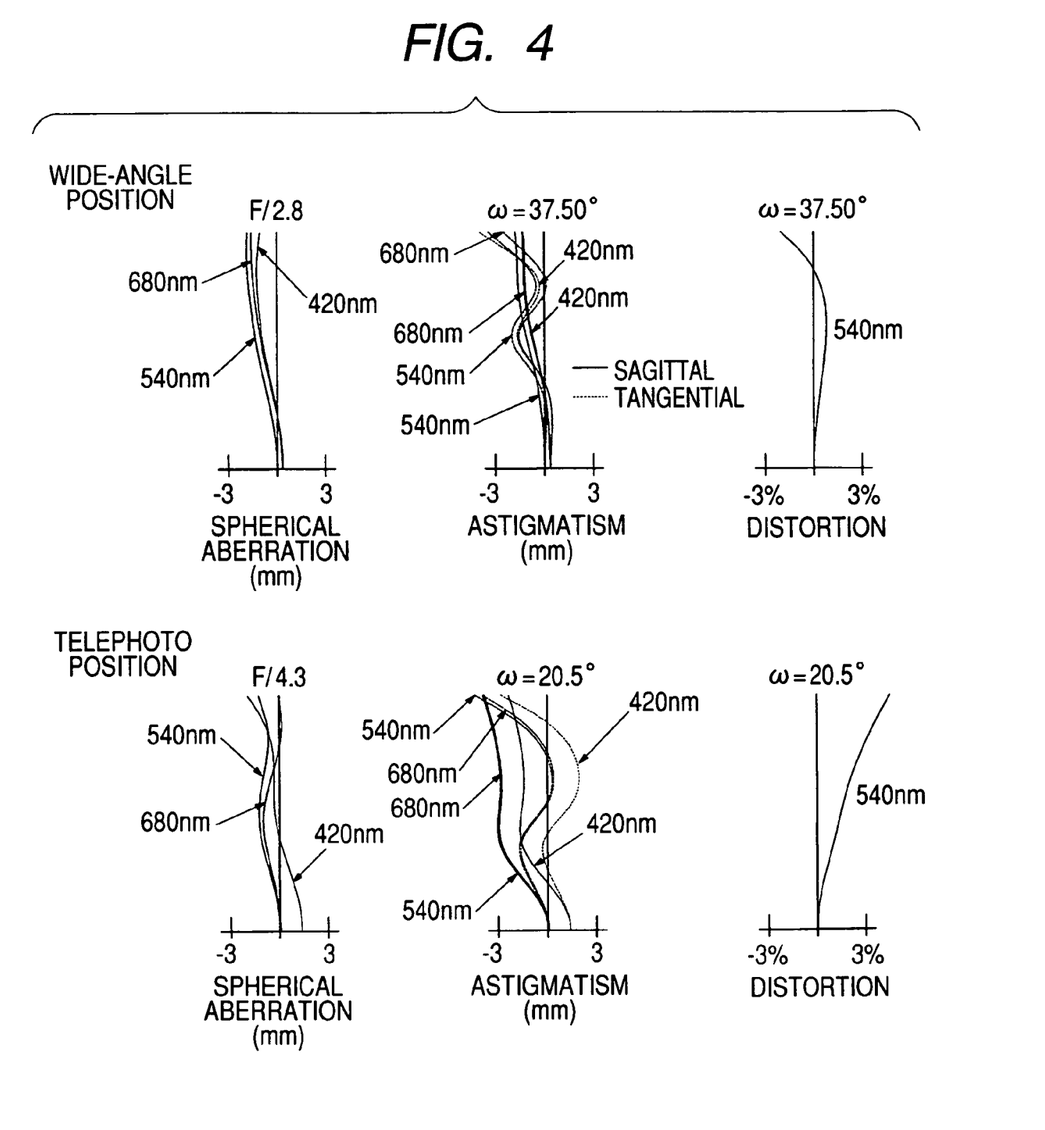
FIG. 4 is an aberration diagram showing the aberrations (spherical aberration, astigmatism and distortion) in the wide-angle and telephoto positions of a dual-focus switchable lens according to an exemplary embodiment 1.

FIG. 4 is an aberration diagram showing the aberrations (spherical aberration, astigmatism and distortion) in the wide-angle and telephoto positions of the dual-focus switchable lens according to the embodiment 1. In each astigmatism diagram, there is shown an aberration on sagittal and tangential image surfaces (true for FIGS. 5, 6 and 7).

As apparent from FIG. 4, the dual-focus switchable lens in the embodiment 1 is to favorably correct for aberration over the entire region of magnification change.

Embodiment 2

Explanation is now made on a dual-focus switchable lens according to an embodiment 2.

The lens in the embodiment 2 is nearly similar in lens arrangement to the lens in the embodiment 1.

In Table 3, shown are the values of a radius-of-curvature R (mm) of the lens surface according to embodiment 2, an on-axis plane-to-plane spacing D (mm), a refractive index Ne at e-line (546.1 nm) on the lens, and an Abbe number ν at d-line on the lens.

TABLE 3

| Surface | R | D | Ne(546.1 nm) | ν |
|---|---|---|---|---|
| *1 | -5649.32 | 32.16 | 1.80348 | 40.4 |
| *2 | 79.26 | 31.17 | | |
| 3 | 115.94 | 101.05 | 1.92286 | 18.9 |
| 4 | 186.36 | 21.06(W) | | |
|   |   | -7.35(T) | | |
| STO 5 | ∞ | 68.69 | | |
| 6 | 81.57 | 11.51 | 1.75500 | 52.3 |
| 7 | -81.57 | 7.94 | 1.80518 | 25.4 |
| 8 | 368.59 | 14.09 | | |
| *9 | 87.53 | 68.49 | 1.50842 | 56.4 |

TABLE 3-continued

| Surface | R | D | Ne(546.1 nm) | ν |
|---|---|---|---|---|
| *10 | 92.08 | 148.60(W) | | |
|   |   | 31.76(T) | | |
| 11 | 331.15 | 19.85 | 1.84666 | 23.8 |
| 12 | 1633.29 | 9.93 | | |
| 13 | ∞ | 16.23 | 1.51680 | 64.2 |
| 14 | ∞ | 32.16 | | |

*aspherical surface
f: W: 100-T: 192
Magnification: ×1.92
FNO: 2.8-4.12
Half angle-of-view: W: 38.4° T: 21.3°
Image height: 73.35

Furthermore, in this embodiment, the conditional expressions (1)-(8) are all satisfied wherein the values are shown in Table 9.

In this embodiment, the fifth lens $L_5$ has both surfaces respectively provided with aspherical surfaces whose shapes are expressed by the aspherical surface expression given in the above equation 1. Meanwhile, the first lens $L_1$ has both surfaces respectively provided with aspherical surfaces whose shapes are expressed by the aspherical surface expression given in the following equation 2.

Meanwhile, Table 4 shows the values of constants K, $A_4$, $A_6$, $A_8$ and $A_{10}$ for the aspherical surface shown in the aspherical expression of equation 1, and the values of constants K, $B_3$, $B_4$, $B_5$, $B_6$, $B_7$, $B_8$, $B_9$ and $B_{10}$ for the aspherical surface shown in the aspherical expression of equation 2. Incidentally, the value R as to each of the surfaces 1, 2, 9 and 10 in Table 3 is substituted in R of the aspherical expression.

TABLE 4

| Surface No. | | | | | |
|---|---|---|---|---|---|
| 1 | K | $B_3$ | $B_4$ | $B_5$ | $B_6$ |
|   | 45.26008 | 0.00000 | $1.36945 \times 10^{-6}$ | 0.00000 | $-3.88944 \times 10^{-11}$ |
|   |   | $B_7$ | $B_8$ | $B_9$ | $B_{10}$ |
|   |   | $9.41204 \times 10^{-12}$ | $-1.84923 \times 10^{-13}$ | $1.61337 \times 10^{-15}$ | $-5.44881 \times 10^{-18}$ |
| 2 | K | $B_3$ | $B_4$ | $B^5$ | $B_6$ |
|   | -0.19411 | 0.00000 | $3.21010 \times 10^{-6}$ | $-8.35315 \times 10^{-8}$ | $1.04135 \times 10^{-9}$ |
|   |   | $B_7$ | $B_8$ | $B_9$ | $B_{10}$ |
|   |   | $1.05556 \times 10^{-11}$ | $-5.46941 \times 10^{-13}$ | $6.71255 \times 10^{-15}$ | $-2.78723 \times 10^{-17}$ |

TABLE 4-continued

| Surface No. | | | | | |
|---|---|---|---|---|---|
| 9 | K | $A_4$ | $A_6$ | $A_8$ | $A_{10}$ |
| | −11.96262 | $3.37346 \times 10^{-6}$ | $-6.82631 \times 10^{-9}$ | $9.60047 \times 10^{-13}$ | $1.26965 \times 10^{-15}$ |
| 10 | K | $A_4$ | $A_6$ | $A_8$ | $A_{10}$ |
| | −3.68709 | $1.45371 \times 10^{-6}$ | $2.90461 \times 10^{-10}$ | $-1.69827 \times 10^{-12}$ | $-5.11975 \times 10^{-16}$ |

Figure 5:
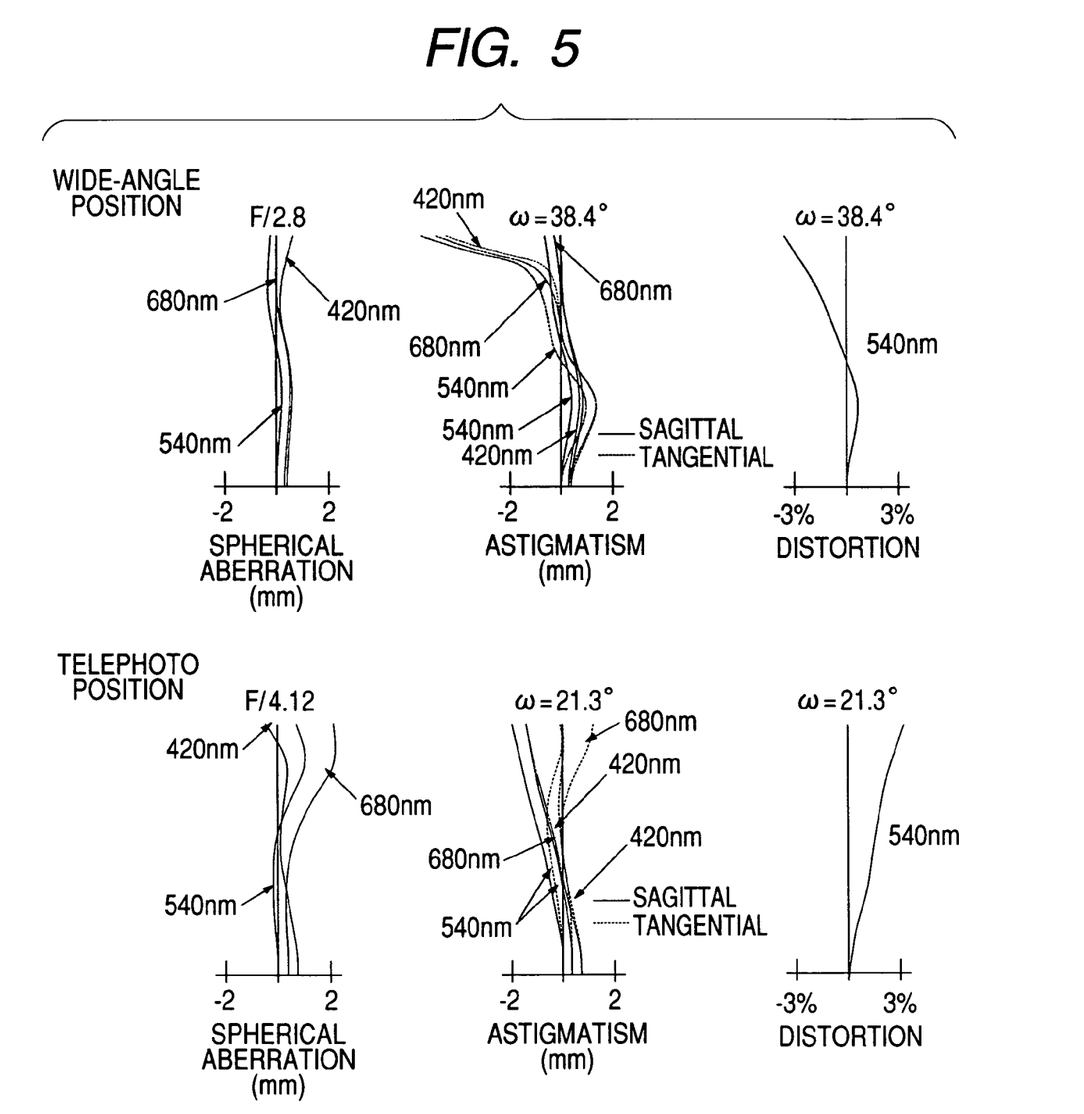
FIG. 5 is an aberration diagram showing the aberrations (spherical aberration, astigmatism and distortion) in the wide-angle and telephoto positions of a dual-focus switchable lens according to an exemplary embodiment 2.

FIG. 5 is an aberration diagram showing the aberrations (spherical aberration, astigmatism and distortion) in the wide-angle and telephoto positions of the dual-focus switchable lens according to the embodiment 2.

As apparent from FIG. 5, the dual-focus switchable lens in the embodiment 2 is to favorably correct for aberration over the entire region of magnification change.

Embodiment 3

Explanation is now made on a dual-focus switchable lens according to an embodiment 3.

Furthermore, in this embodiment, the conditional expressions (1)-(8) are all satisfied wherein the values are shown in Table 9.

In this embodiment, the first and fifth lens $L_1$, $L_5$ each have both surfaces respectively provided with aspherical surfaces whose shapes are expressed by the aspherical surface expression given in the above equation 1.

Meanwhile, Table 6 shows the values of constants K, $A_4$, $A_6$, $A_8$ and $A_{10}$ for the aspherical surface shown in the aspherical expression of equation 1. Incidentally, the value R as to each of the surfaces 1, 2, 9 and 10 in Table 5 is substituted in R of the aspherical expression.

TABLE 6

| Surface No. | K | $A_4$ | $A_6$ | $A_8$ | $A_{10}$ |
|---|---|---|---|---|---|
| 1 | 45.26008 | $1.05439 \times 10^{-6}$ | $-2.49943 \times 10^{-11}$ | $-9.96180 \times 10^{-14}$ | $-2.45970 \times 10^{-18}$ |
| 2 | −0.19411 | $2.46233 \times 10^{-6}$ | $6.69531 \times 10^{-10}$ | $-2.94630 \times 10^{-13}$ | $-1.25874 \times 10^{-17}$ |
| 9 | −11.96262 | $2.59276 \times 10^{-6}$ | $-4.39301 \times 10^{-9}$ | $5.11305 \times 10^{-13}$ | $5.64889 \times 10^{-16}$ |
| 10 | −3.68709 | $1.17646 \times 10^{-6}$ | $1.39123 \times 10^{-10}$ | $-9.00508 \times 10^{-13}$ | $-2.00899 \times 10^{-16}$ |

The lens in the embodiment 3 is nearly similar in lens arrangement to the lens in the embodiment 1.

In Table 5, shown are the values of a radius-of-curvature R (mm) of the lens surface according to embodiment 3, an on-axis plane-to-plane spacing D (mm), a refractive index Ne at e-line (546.1 nm) on the lens, and an Abbe number ν at d-line on the lens.

TABLE 5

| Surface | R | D | Ne(546.1 nm) | ν |
|---|---|---|---|---|
| *1 | −2969.89 | 21.69 | 1.80825 | 40.4 |
| *2 | 87.02 | 34.88 | | |
| 3 | 128.09 | 33.18 | 1.93431 | 18.9 |
| 4 | 213.22 | 136.62(W) | | |
| | | 11.85(T) | | |
| STO 5 | ∞ | −8.67 | | |
| 6 | 88.71 | 75.08 | 1.75844 | 52.3 |
| 7 | −88.71 | 12.58 | 1.81265 | 25.4 |
| 8 | 357.61 | 7.91 | | |
| *9 | 94.96 | 14.08 | 1.51051 | 56.3 |
| *10 | 103.48 | 79.18(W) | | |
| | | 203.96(T) | | |
| 11 | 438.56 | 34.70 | 1.85331 | 24.4 |
| 12 | ∞ | 21.69 | | |
| 13 | ∞ | 10.84 | 1.51872 | 64.2 |
| 14 | ∞ | 8.17 | | |

*aspherical surface
f: W: 99.3-T248.25
Magnification: ×2.5
FNO: 2.91-4.81
Half angle-of-view: W: 40.0° T: 17.4°
Image height: 80.02

Figure 6:
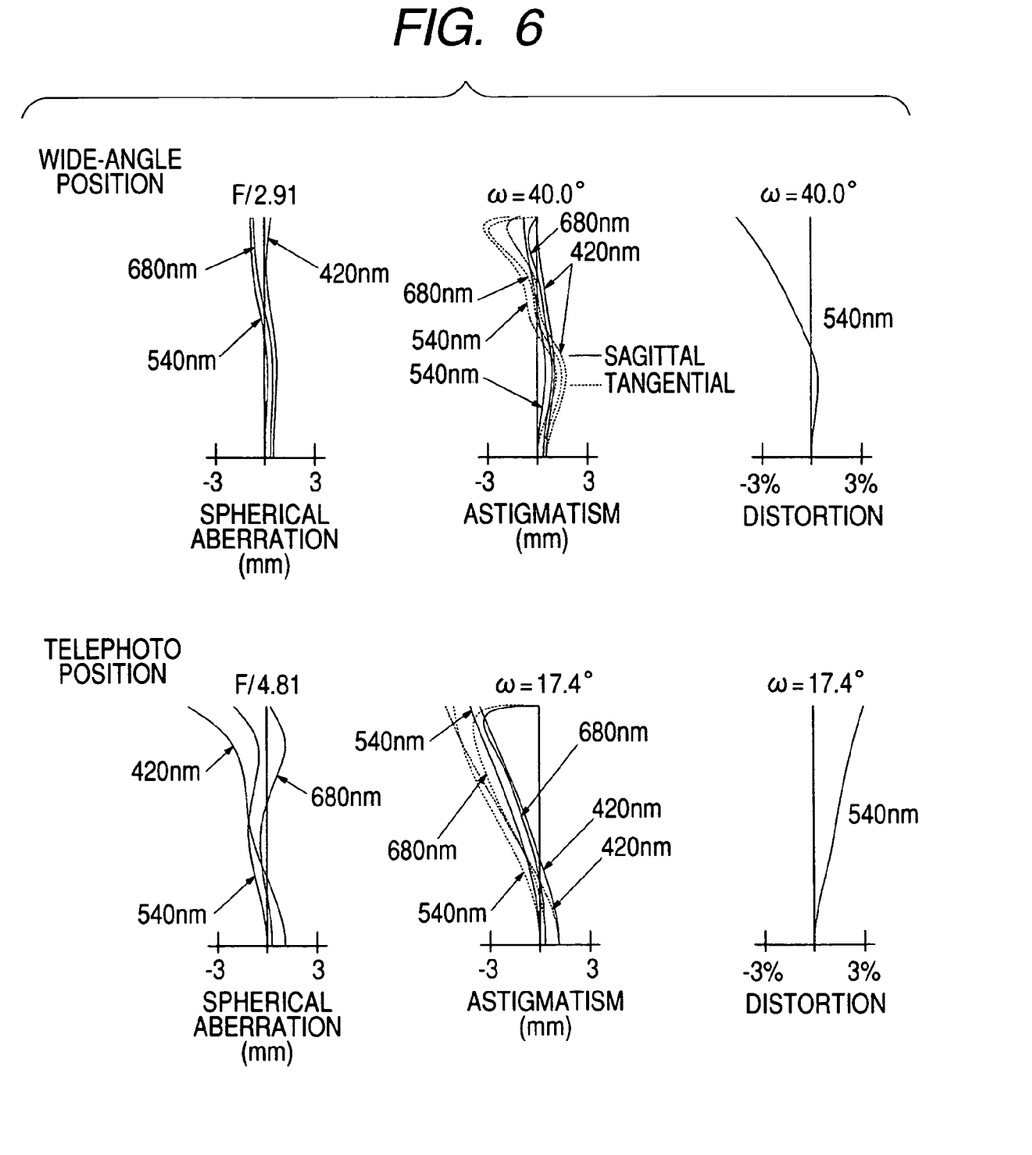
FIG. 6 is an aberration diagram showing the aberrations (spherical aberration, astigmatism and distortion) in the wide-angle and telephoto positions of a dual-focus switchable lens according to an exemplary embodiment 3.

FIG. 6 is an aberration diagram showing the aberrations (spherical aberration, astigmatism and distortion) in the wide-angle and telephoto positions of the dual-focus switchable lens according to the embodiment 3.

As apparent from FIG. 6, the dual-focus switchable lens in the embodiment 3 is to favorably correct for aberration over the entire region of magnification change.

Embodiment 4

Explanation is now made on a dual-focus switchable lens according to an embodiment 4.

Figure 3:
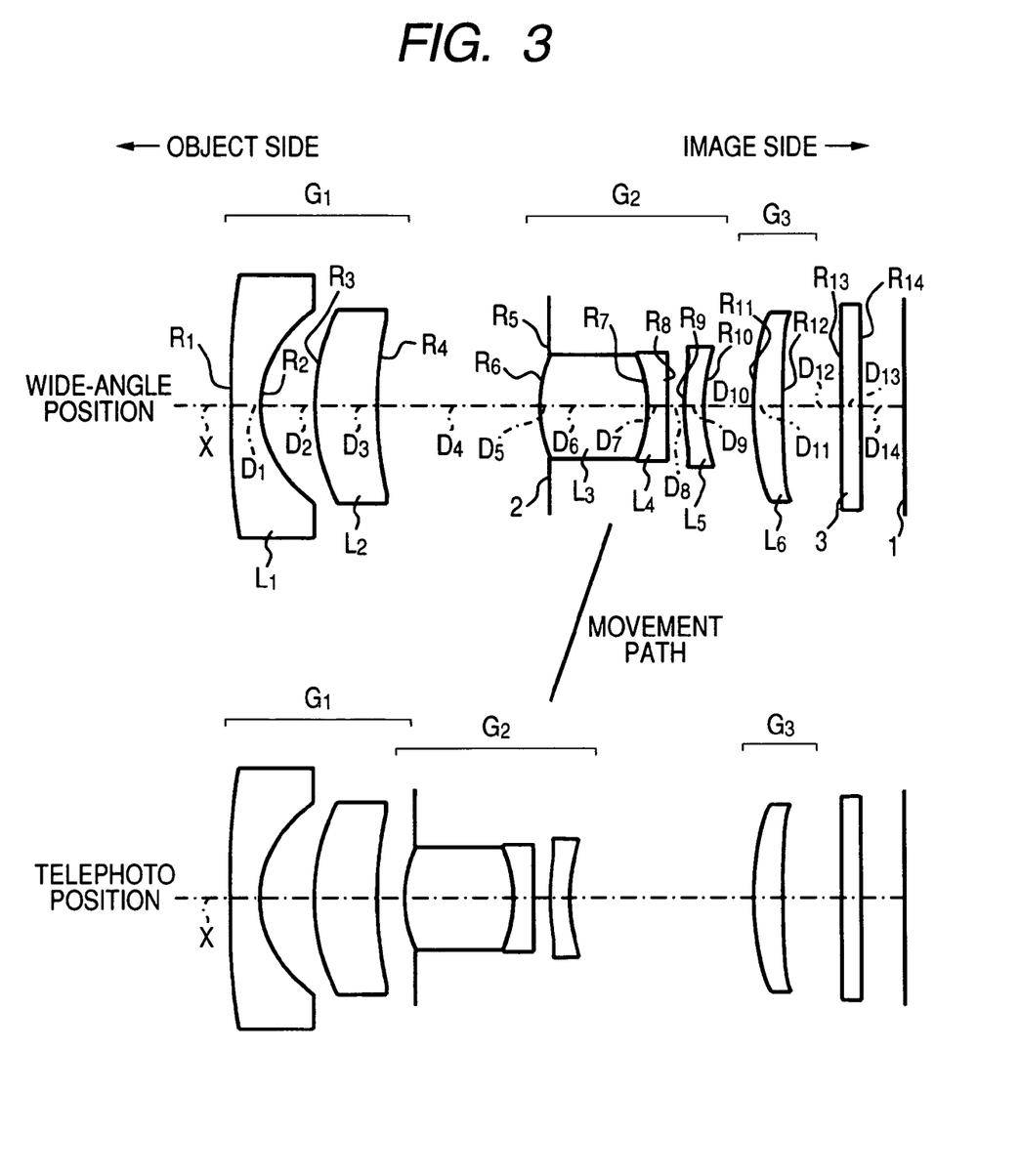
FIG. 3 is a schematic view showing a basic arrangement of a dual-focus switchable lens according to an exemplary embodiment 4 of the invention.

The lens in the embodiment 4 is nearly similar in lens arrangement to the lens in the embodiment 1, as shown in FIG. 3. However, there is a difference mainly in that the sixth lens $L_6$ constituting the third lens group $G_3$ is provided as a lens having an aspherical-surface at each side thereof, which is formed by a positive meniscus lens having a surface having an intense curvature toward the object side.

In Table 7, shown are the values of a radius-of-curvature R (mm) of the lens surface according to embodiment 4, an on-axis plane-to-plane spacing D (mm), a refractive index Ne at e-line (546.1 nm) on the lens, and an Abbe number ν at d-line on the lens.

TABLE 7

| Surface | R | D | Ne(546.1 nm) | ν |
|---|---|---|---|---|
| *1 | −999.21 | 23.00 | 1.80825 | 40.4 |
| *2 | 100.37 | 41.46 | | |
| 3 | 178.28 | 48.42 | 1.93431 | 18.9 |
| 4 | 328.55 | 133.46(W) | | |

TABLE 7-continued

| Surface | R | D | Ne(546.1 nm) | ν |
|---|---|---|---|---|
|  |  | 29.28(T) |  |  |
| STO 5 | 0.00 | −7.86850 |  |  |
| 6 | 106.10 | 84.13 | 1.77622 | 49.6 |
| 7 | −106.10 | 15.43 | 1.85506 | 23.8 |
| 8 | 0.00 | 13.01 |  |  |
| *9 | 163.07 | 15.13 | 1.51224 | 55.9 |
| *10 | 132.37 | 38.74(W) |  |  |
|  |  | 142.92(T) |  |  |
| 11 | 249.14 | 22.39 | 1.54603 | 55.6 |
| 12 | 1150.61 | 45.19 |  |  |
| 13 | 0.00 | 15.13 | 1.51872 | 64.2 |
| 14 | 0.00 | 34.59 |  |  |

*aspherical surface
f: W: 100.00-T: 200.0
Magnification: ×2.0
FNO: 2.88-4.27
Half angle-of-view: W: 41.9° T: 22.3°
Image height: 86.7

Furthermore, in this embodiment, the conditional expressions (1)-(8) are all satisfied wherein the values are shown in Table 9.

In this embodiment, the first, fifth and sixth lenses $L_1$, $L_5$, $L_6$ each have both surfaces given by aspherical surfaces whose shapes are expressed by the aspherical surface expression given in the above equation 1.

Meanwhile, Table 8 shows the values of constants K, $A_4$, $A_6$, $A_8$ and $A_{10}$ for the aspherical surface shown in the aspherical expression of equation 1. Incidentally, the value R as to each of the surfaces 1, 2, 9, 10, 11 and 12 in Table 7 is substituted in R of the aspherical expression.

TABLE 8

| Surface No. | K | $A_4$ | $A_6$ | $A_8$ | $A_{10}$ |
|---|---|---|---|---|---|
| 1 | 15.08937 | $6.28218 \times 10^{-7}$ | $-5.32284 \times 10^{-12}$ | $-7.94407 \times 10^{-14}$ | $-1.45959 \times 10^{-18}$ |
| 2 | −1.49829 | $1.77204 \times 10^{-6}$ | $5.95209 \times 10^{-10}$ | $-2.39321 \times 10^{-13}$ | $-9.02761 \times 10^{-18}$ |
| 9 | −26.89681 | $2.91211 \times 10^{-6}$ | $-2.81499 \times 10^{-9}$ | $6.91347 \times 10^{-13}$ | $4.14901 \times 10^{-16}$ |
| 10 | −3.23200 | $2.08203 \times 10^{-6}$ | $-3.13685 \times 10^{-9}$ | $-3.01751 \times 10^{-13}$ | $1.57211 \times 10^{-16}$ |
| 11 | −43.60074 | $2.57027 \times 10^{-7}$ | $-5.76989 \times 10^{-11}$ | $8.49332 \times 10^{-15}$ | $-5.99940 \times 10^{-19}$ |
| 12 | 1.44413 | $5.24338 \times 10^{-8}$ | $-7.91655 \times 10^{-12}$ | $-8.61769 \times 10^{-16}$ | $3.38536 \times 10^{-20}$ |

Figure 7:
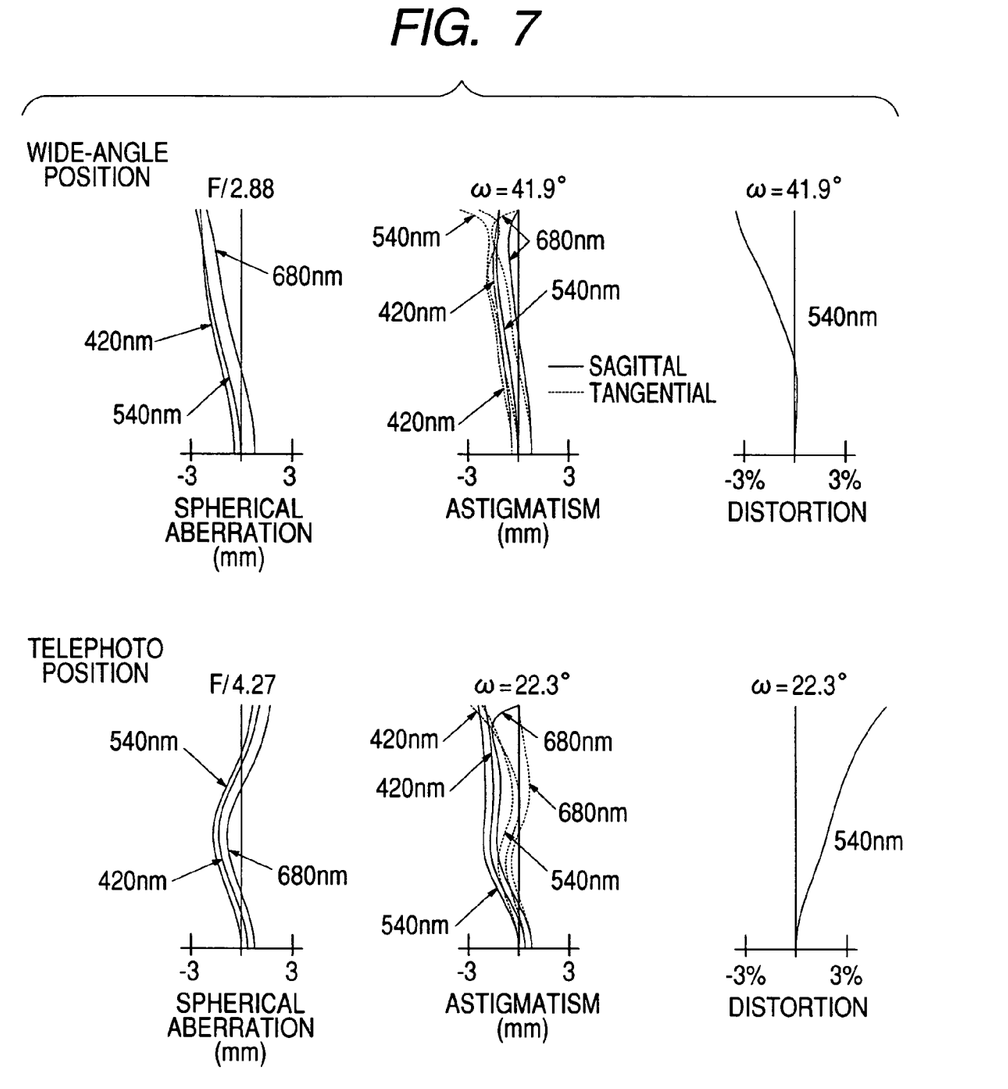
FIG. 7 is an aberration diagram showing the aberrations (spherical aberration, astigmatism and distortion) in the wide-angle and telephoto positions of a dual-focus switchable lens according to an exemplary embodiment 4.

FIG. 7 is an aberration diagram showing the aberrations (spherical aberration, astigmatism and distortion) in the wide-angle and telephoto positions on the dual-focus switchable lens according to the embodiment 4.

As apparent from FIG. 7, the dual-focus switchable lens in the embodiment 4 is to favorably correct for aberration over the entire region of magnification change.

TABLE 8

| Surface No. | K | A4 | $A_6$ | $A_8$ | $A_{10}$ |
|---|---|---|---|---|---|
| 1 | 15.08937 | $6.28218 \times 10^{-7}$ | $-5.32284 \times 10^{-12}$ | $-7.94407 \times 10^{-14}$ | $-1.45959 \times 10^{-18}$ |
| 2 | −1.49829 | $1.77204 \times 10^{-6}$ | $5.95209 \times 10^{-10}$ | $-2.39321 \times 10^{-13}$ | $-9.02761 \times 10^{-18}$ |
| 9 | −26.89681 | $2.91211 \times 10^{-6}$ | $-2.81499 \times 10^{-9}$ | $6.91347 \times 10^{-13}$ | $4.14901 \times 10^{-16}$ |
| 10 | −3.23200 | $2.08203 \times 10^{-6}$ | $-3.13685 \times 10^{-9}$ | $-3.01751 \times 10^{-13}$ | $1.57211 \times 10^{-16}$ |
| 11 | −43.60074 | $2.57027 \times 10^{-7}$ | $-5.76989 \times 10^{-11}$ | $8.49332 \times 10^{-15}$ | $-5.99940 \times 10^{-19}$ |
| 12 | 1.44413 | $5.24338 \times 10^{-8}$ | $-7.91655 \times 10^{-12}$ | $-8.61769 \times 10^{-16}$ | $3.38536 \times 10^{-20}$ |

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-282790 filed Sep. 28, 2005, the contents of which is incorporated herein by reference.

What is claimed is:

1. A dual-focus switchable lens comprising: in order from an object side of the dual-focus switchable lens,
   a first lens group having a negative refractive power, the first lens group comprising a first lens having a negative refractive power and a second lens having a positive refractive power in order from the object side, at least one of the first and second lenses being an aspherical lens;
   a second lens group having a positive refractive power, the second lens group comprising a cemented lens and a single lens having an aspherical surface and having a negative refractive power in order from the object side;
   a third lens group having a positive refractive power, the third lens group comprising a positive lens,
   wherein
   two focal points of the dual-focus switchable lens is switched by moving the second lens group while maintaining the first and third lens groups substantially stationary, and
   the dual-focus switchable lens satisfies conditional expressions (1) to (6):

$$22 < (W_w + W_t)/2 < 34 \qquad (1)$$

$$2 < f_5/f_w \qquad (2)$$

$$4.5 < T_L/Y_{IM} < 6.5 \qquad (3)$$

$$1.75 \leq f_t/f_w \leq 3.0 \quad (4)$$

$$2.3 \leq FNO_w \leq 3.5 \quad (5)$$

$$16.0 \leq v_1 - v_2 \quad (6)$$

wherein
- $W_w$ represents a half angle-of-view in a wide-angle position of the dual-focus switchable lens;
- $W_t$ represents a half angle-of-view in a telephoto position of the dual-focus switchable lens;
- $f_w$ represents a focal length of the dual-focus switchable lens in the wide-angle position;
- $f_t$ represents a focal length of the dual-focus switchable lens in the telephoto position
- $f_5$ represents a focal length of the single lens in the second lens group;
- $T_L$ represents a maximum length of the dual-focus switchable lens;
- $Y_{IM}$ represents an image height
- $FNO_w$ represents F number in the wide-angle position;
- $v_1$ represents Abbe number of the first lens; and
- $v_2$ represents Abbe number of the second lens.

2. The dual-focus switchable lens according to claim 1, which satisfies conditional expression (7):

$$0.65 < (f_{1G} + f_{2G} + d_w)/Y_{IM} < 1.3 \quad (7)$$

wherein
- $f_{1G}$ represents a focal length of the first lens group;
- $f_{2G}$ represents a focal length of the second lens group;
- $d_w$ represents a spacing between the first and the second lens groups in the wide-angle position.

3. The dual-focus switchable lens according to claim 1, which satisfies conditional expression (8):

$$1.1 < f_{2G}/f_w < 1.8 \quad (8)$$

wherein $f_{2G}$ represents a focal length of the second lens group.

4. The dual-focus switchable lens according to claim 1, wherein the single lens in the second lens group is a meniscus lens made of a synthetic resin, the meniscus lens having a convex surface directed toward the object side and having an aspherical surface at each side thereof.

5. The dual-focus switchable lens according to claim 1, wherein the second lens group comprises a diaphragm in a position closest to an object.

6. The dual-focus switchable lens according to claim 1, wherein an image-side edge of an image-side lens of the cemented lens and an object-side edge of the single lens each is a flat surface, and the image-side edge of the image-side lens of the cemented lens and the object-side edge of the single lens are in a common straight line.

7. The dual-focus switchable lens according to claim 1, wherein an image-side edge of an image-side lens of the cemented lens and an object-side edge of the single lens each is a flat surface, and the image-side edge of the image-side lens of the cemented lens and the object-side edge of the single lens sandwich a plane parallel plate having surfaces parallel with the flat surface.

* * * * *